US005305952A

United States Patent [19]

Hannarong

[11] Patent Number: 5,305,952
[45] Date of Patent: Apr. 26, 1994

[54] ENERGY SAVING APPARATUS AND METHOD
[75] Inventor: Suwat Hannarong, Bangkok, Thailand
[73] Assignee: EnerSaver (U.S.A.), Inc., Dallas, Tex.
[21] Appl. No.: 919,190
[22] Filed: Jul. 23, 1992
[51] Int. Cl.⁵ .......................................... G05D 23/00
[52] U.S. Cl. ...................................... 236/47; 165/11.1
[58] Field of Search ........................ 236/47; 165/11.1
[56] References Cited

U.S. PATENT DOCUMENTS 4,232,819  11/1980  Bost ........................................ 236/47
4,319,712   3/1982  Bar .................................... 165/11.1 X

FOREIGN PATENT DOCUMENTS 8202608  8/1982  PCT Int'l Appl. .................... 236/47
2142742  1/1985  United Kingdom .................. 236/47

Primary Examiner—William E. Wayner
Attorney, Agent, or Firm—Hubbard, Tucker & Harris

[57] ABSTRACT

To save energy in hotel and motel rooms, apartments and temporarily occupied rooms generally, an apparatus for saving energy includes a temperature control circuit that overrides a thermostat for controlling an air conditioning unit in a hotel room and a switching circuit to disconnect power to lights when the room is not being occupied. The temperature control circuit maintains the temperature of the room at a higher temperature to save energy, but not so high as to return the temperature of the room to a comfortable temperature. To return power to lights and control of the air conditioning unit to the thermostat, a tag attached to a key necessary for entering the room must be inserted into a switch included with the apparatus. A delay circuit permits the person sufficient time to leave the room after removing the tag before the thermostat is overridden and power to the lights disconnected.

3 Claims, 3 Drawing Sheets

ENERGY SAVING APPARATUS AND METHOD

FIELD OF THE INVENTION

The invention relates to a device for automatically turning off lights and reducing climatic conditioning of a room in a hotel, apartment or other multiple resident dwelling during periods when the room is not occupied by a person.

BACKGROUND OF THE INVENTION

Multiple resident dwellers, such as hotel and motel guests, actually occupy a rented room /nly a small percentage of the day. During the time that the room is unoccupied, lights in the bathroom, closet, and bedroom are frequently left on. Furthermore, many hotel and motel rooms are now equipped, for the convenience of the guest, with individual air conditioning units. A guest sets the preferred temperature on a thermostat in the room. Very rarely will a guest turn off the air conditioner or turn up the temperature of the air conditioner when leaving the room. Consequently, energy is wasted on illuminating and maintaining a comfortable temperature in an unoccupied room.

SUMMARY OF THE INVENTION

The invention is an apparatus and method for reducing energy consumption during periods when hotel rooms, apartments and offices, and other infrequently occupied rooms are vacant without significant inconvenience to guests and occupants. When an occupant leaves a room, the apparatus switches to a "vacant" mode and automatically turns off power to the lights and overrides a thermostat controllable by the occupant or guest with a thermostat preset to a higher temperature. The device maintains the preset temperature in the room while it is unoccupied. When the guest returns, the apparatus switches to an "occupied" mode and restores control of the lights and to the room's thermostat.

By maintaining the preset temperature, the room temperature is restored to the occupant's preference as quickly as possible upon the occupant's return. Turning the air conditioning off often results in a room that is too stuffy and hot and that cannot be cooled down quickly enough to be tolerated by an occupant.

The apparatus determines whether the room is occupied with a switch that is operated with a tag associated or integral with a room key. The tag is inserted into the switch and must remain there for the occupant to have control over the lights and the air conditioner. As the door to the room locks automatically, the tag must be taken when the occupant leaves the room.

The apparatus and method may also be used with thermostatically controlled heating systems.

In accordance with another aspect of the invention, the apparatus includes a delay circuit for delaying switching from an "occupied" mode to "vacant" mode to allow an occupant sufficient time to leave the room before turning out the lights.

In accordance with a further aspect of the invention, the apparatus is an integral unit that is installed in rooms and coupled with commercially available thermostats and conventional lighting without significant modification to the thermostat or the lighting. Consequently, the apparatus is relatively inexpensive and easy to install in new rooms and to retrofit to preexisting rooms.

Still other advantages of the invention will be apparent from the following detailed description, which, together with the appended drawings, illustrate and describe the preferred embodiment of the invention and the best mode for carrying out the invention. The invention is capable of other and different embodiments and modifications without departing from it. Accordingly, the drawings and their description are to be regarded as illustrative in nature and not as restricting the scope invention to this preferred embodiment.

DETAILED DESCRIPTION OF THE PREFERRED EMBODIMENT

Figure 1:
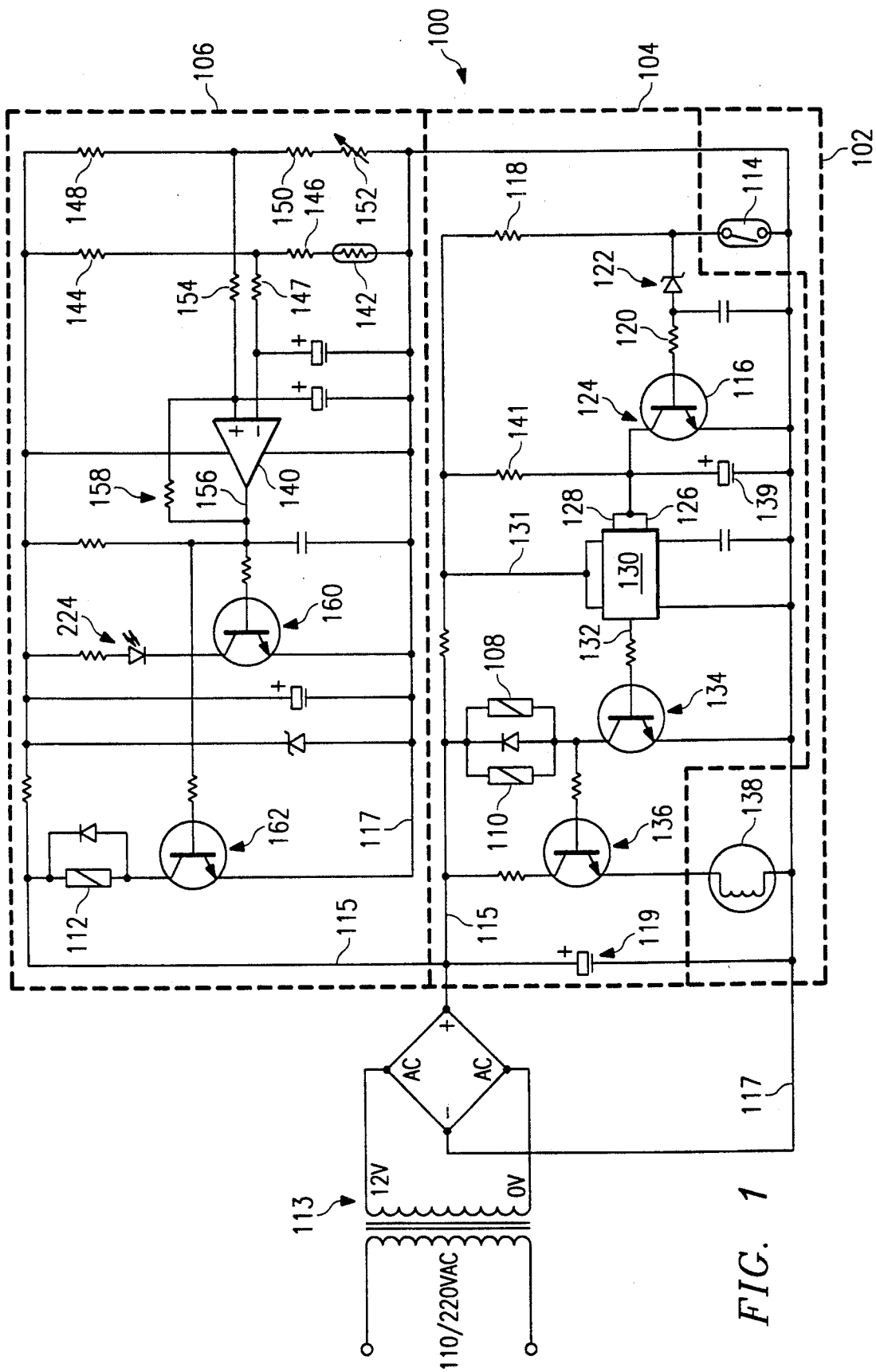
FIG. 1 is a schematic diagram of electrical circuits for an energy saving apparatus in accordance with the invention.
Figure 2:
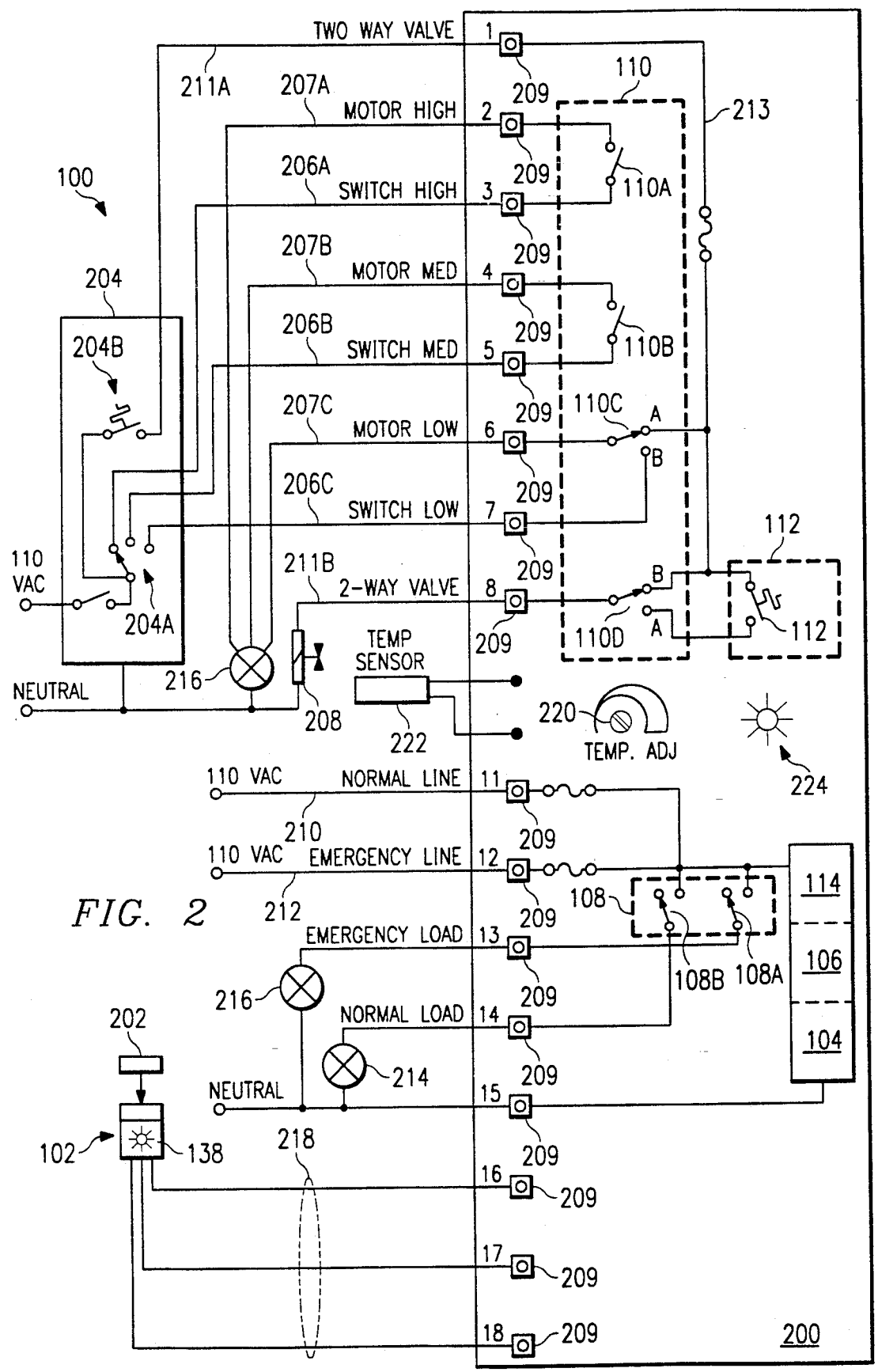
FIG. 2 is a schematic diagram of an energy saving apparatus in accordance with the present invention coupled with an occupant's thermostat and power lines for controlling lighting in a room.

Referring to FIGS. 1 and 2, an apparatus 100 for saving energy in rooms is schematically illustrated. Major components of the apparatus include key tag switch 102, time delay circuit 104, temperature control circuit 106, relays 108, 110 and 112, and power supply 113.

The apparatus 100 is an integral unit that is installed with commercially available air conditioner systems and conventional wiring systems for hotels and motels. Within housing 200 is time delay circuit 104 and temperature control circuit 106. Preferably, the housing 200 is located where it cannot be tampered with by an occupant. Key tag switch 102 is placed in a clearly visible and accessible location in a room and connected by wires 218 to housing 200. Inserting a key tag 202 into a slot in key tag switch 102 places apparatus 100 into a vacant or first state. Removing the key tag begins a transition in the apparatus to a "vacant" state.

An occupant's thermostat control unit 204, which can be set by an occupant, includes a switch 204A that controls speeds of a multi-speed AC motor in blower 206 with switch high control line 206A, switch medium control line 206B and switch low control line 206C. Each control line 206A-206C is connected, respectively, to a switch 110A-110C in relay 110 through one of the plurality of terminals 209 on the exterior of housing 200. When switches 110A and 110B are closed by energizing coils in relay 110, they connect switch high and switch medium control lines 206A and 206B from the thermostat to motor high and motor medium control lines 207A and 207B, respectively. Switch 110C has positions A and B. Energizing relay 110 places switch 110C in position B. In position B, motor low control line 206C is connected to motor low control line 207C of blower 206.

A thermostatically controlled switch 204B determines whether the two way valve 208 should be opened for delivery of chilled water or refrigerant for cooling through control line 211B by switching on an AC voltage signal on control line 211A. The temperature at which thermostatically switch 204B is closed shall be referred to as $T_{occupant}$. Control line 211A is connected to one of the plurality of terminals 209 on the housing 200, which terminal is connected to an internal line 213.

The internal line is connected to contact A of switch 110C, contact B of switch 110D and a contact of relay switch 112A. Relay switch 110D acts to switch relay switch 112A in and out of series with a circuit formed by thermostatically controlled switch 204B, internal line 213 and two way valve control line 211B. Switch 110D assumes position B when relay 110 is energized and the apparatus is in an "occupied" state. In position B, relay switch 110D bypasses relay switch 112A and directly connects thermostatically controlled switch 204B to the two way valve 208.

Apparatus 100 transitions into and remains in the vacant state in which relay 110 is deenergized approximately 30 seconds after an occupant vacates the room. Time delay circuit 104 delays deenergizing relays 108 and 110. In the vacant state, relay switches 110A and 110B are opened and relay switch 110C is moved to position A. This removes control over speed of blower 206 from switch 204A. With relay switch 110C in position A, thermostatically controlled switch 204B, through control line 211A and internal line 213, turns on the blower 206 to a low speed when the room temperature, $T_{room}$, exceeds $T_{occupant}$. In position A, relay switch 110D connects two way valve control line 211B to one contact of relay switch 112A.

Relay switch 112A is thermostatically controlled by temperature control circuit 106. The temperature control circuit is coupled to temperature sensor 222 for sensing $T_{room}$. The temperature sensor is connected to housing 200 so that the sensor may be placed in the room while the housing 200 is placed in a more secure area. A hotel operator adjusts the temperature at which relay switch 112A is closed, which will be referred to as $T_{set}$, by temperature control circuit 106, with temperature adjust knob 220. Closing relay switch 112A opens two-way valve 208 for a flow of chilled water or refrigerant from a compressor for cooling the room. During vacancy, this configuration places the thermostatically controlled relay switch 112A in series with the thermostatically controlled switch 204B so that cooling is controlled with the thermostat set at the higher temperature, whether it is $T_{occupant}$ or $T_{set}$. LED 224 is illuminated to indicate to indicate that the room is being cooled.

Using several of the plurality of terminals 209 on the housing 200, normal and emergency power lines 210 and 212 for the room are coupled, respectively, to lines to normal and emergency lights 214 and 216 with relay switches 108A and 108B, respectively. In the occupied state, relay switches 108A and 108B close and connect, respectively, power to the normal and emergency lights 214 and 216. In the vacant state, relay switch 108A and 108B open and thereby turn off any lights left on.

Referring now to FIG. 1 only for a description of the time delay circuit 104 and the temperature control circuit 106.

Power for the time delay and the temperature control circuits are provided by power supply 113. The power supply downconverts standard wall AC voltage and rectifies the current to create a supply voltage on line 115. Line 117 is connected to ground. Capacitor 119 operates as a high pass filter for grounding high frequency components in the supply voltage on line 115.

Key tag switch 102, schematically illustrated, includes a reed switch 114 that is biased to a closed position with a magnetic field generated by a permanent magnet (not shown) mounted in close proximity to the reed switch. The key tag 202 is attached to a room key and fits within a slot (not indicated) defined in key tag switch. The room key may be any sort of apparatus necessary for entering the room. Furthermore, the tag may be incorporated with or the same as the room key. The slot, the permanent magnet and the reed switch are arranged so that insertion of the key tag shunts the magnetic field, causing the reed switch 114 to open.

Alternately, the key tag switch 102 may be fitted with a microswitch that the key tag moves. However, a microswitch may be moved by insertion of a suitably sized /bject in the slot, and thus the key tag switch defeated. A magnetically operated reed switch however is not so easily defeated. Furthermore, the tag may be encoded magnetically, or electrically, or mechanically, in which case the key tag switch requires a reader for deciphering and matching the code.

When the key tag is inserted into the key tag switch 102—referred to as the home position—the apparatus transitions to the occupied state. The reed switch 114 opens and NPN transistor 116 is turned on by a current flowing through a biasing circuit including resistors 118 and 120 and Zenner diode 122. The transistor then conducts current through its collector 124, tending to pull down the voltage on trigger input 126 and threshold input 128 to timer circuit 130 to logic low level and causing the voltage level on output line 132 of timer circuit 130 to go high. Timer circuit 130 is preferably a NE555. A high voltage on the output line 132 drives NPN transistor 134 on. Turning on transistor 134 energizes relays 108 and 110. It also turns off NPN transistor 136 so that no current flows through light emitting diode (LED) 138.

When the key tag 202 is removed, contacts of the reed switch 114 close and the apparatus begins a transition to the vacant state. Closing of the reed switch shunts current from the base of transistor 116. Shunting current form the base turns the transistor off, opening its collector 124. Voltage on timing capacitor 139 increases at a rate determined by the value of the resistor 141 and the timing capacitor. When the voltage across the timing capacitor reaches approximately 2/3 of the supply voltage on line 115, preferably in around 30 seconds, the timing circuit 130 switches states, its output on line 132 going low. A low voltage level on line 132 turns off transistor 134 and relays 108 and 110, and also turns on transistor 136. When turned on, transistor 136 provides current to LED 138 for illumination. LED 138 is located with the key tag switch 102 and indicates, when illuminated, that the apparatus 100 is in the vacant state.

Temperature control circuit 106 includes a precision comparator 140, such as a LM311, that is provided on its non-inverting input a threshold voltage representing $T_{set}$ and, on its inverting input, a voltage representing $T_{room}$. An NTC thermistor 142 forms room temperature sensor 222 (FIG. 2). The thermistor has a resistance inversely related to its temperature and, thus, the temperature of the room.

A bridge circuit is set up to provide the threshold voltage to the non-inverting input and a voltage relating the $T_{room}$ on the inverting input. The thermistor and resistors 144 and 146 form one arm of the bridge circuit that is connected to inverting input of comparator 140 through resistor 147. This arm acts a voltage divider for generating a voltage that increases with the resistance of thermistor 142. The other arm of the bridge circuit is connected to the non-inverting input of the comparator through resistor 154. It is a voltage divider that uses resistors 148 and 150 and variable resistor 152. Increasing the resistance of the variable resistor increases the threshold voltage. Variable resistor 152 is adjusted with temperature adjust knob 220 (FIG. 2) for setting $T_{set}$.

When $T_{room}$ falls, the resistance of thermistor 142 increases, increasing voltage on the inverting input of comparator 140. The output of comparator 140 on line 156 goes low when the voltage on the inverting input exceeds the threshold voltage on the non-inverting input. This is called the switch point. A feedback loop between the output and the non-inverting input of the comparator that includes resistor 158 provides a small degree of positive or regenerative feedback so that the transition in the state of the comparator is clean and rapid at the switch point. The feedback loop also creates a hysteresis to avoid frequent cycling at $T_{set}$.

A low output voltage on line 156 turns off NPN transistors 160 and 162. Turning off transistor 162 turns off or deenergizes relay 112. Turning off transistor 160 turns off LED 224.

When $T_{room}$ increases to a point that the voltage on the inverting input of the comparator drops below the threshold voltage, the output voltage of the comparator on line 156 goes high. This high output voltage turns on transistors 160 and 162, causing their collectors to conduct current that turns on LED 224 and energizes relay 112.

A specially programmed microprocessor or microcontroller may be used in place of the discrete component delay circuit and/or temperature control circuit.

Figure 3:
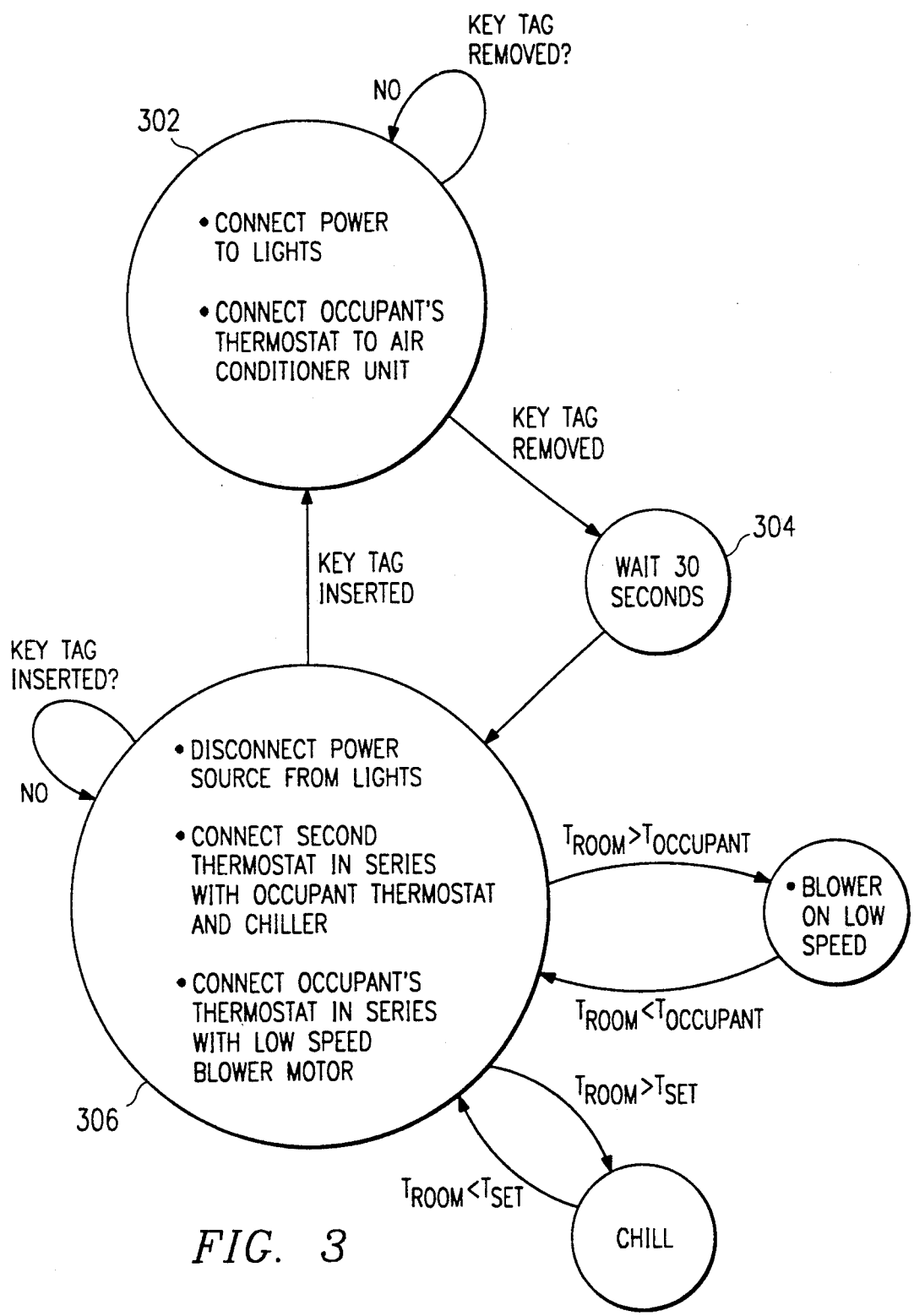
FIG. 3 is a state diagram for an energy saving apparatus in accordance with the invention.

Referring now to FIG. 3, a state diagram 300 shows the three states that the apparatus 100 (FIG. 1) may assume, as described above, and illustrates a method of saving energy in the room.

The occupied state is indicated by circle 302. The apparatus remains in the occupied state so long as the key tag is in the key tag switch. In the occupied state, power to the room lights remains connected and an occupant's thermostat remains connected to the air conditioning unit.

When a key tag is removed from the key tag switch, the state of apparatus 100 moves to transition state indicated by circle 304 in which it waits or delays for a fixed time, preferably around 30 seconds.

Once the fixed delay time expires, the state of apparatus moves to vacant state indicated by circle 306. In the vacant state, power to room lights are disconnected and a second thermostat is connected in series with an occupant's thermostat for controlling chilling the room. The chilling is enabled only when $T_{room}$ exceeds the higher of $T_{occupant}$ and $T_{set}$. Furthermore, the occupant's thermostat is connected to a low setting on a blower so that air is circulated in the room when $T_{room}$ exceeds $T_{occupant}$ so that the room is ventilated. All other blower speeds are disabled.

When a key tag is inserted into the key tag switch, the state of apparatus 100 immediately moves to occupied state indicated by circle 302.

What is claimed is:

1. An apparatus for saving energy in climate controlled space infrequently occupied, the apparatus comprising:

a switch operable by a specially adapted object in the possession of an occupant; the switch assuming a first state when the object is received and assuming a second state when the object is removed; the switch being adapted for mounting near an entrance to a room; and a housing including:

first means for disconnecting power from light circuits in the room in response to the switch assuming the second state and connecting power to the light circuits in response to the switch assuming the first state;

a first thermostat having a set temperature not controllable by a room occupant, the set temperature reducing energy consumption;

second means placed in series with an air conditioning unit and a second occupant-controllable thermostat, said second means for switching the first thermostat into series with the air conditioning unit and for disconnecting the second thermostat from the air conditioning unit in response to the switch assuming the second state; and delay means for generating a delay signal for a predetermined period following receipt of a signal from the switch indicating assumption of the second state upon removal of the object; the delay signal being provided to the first means for disconnecting power and to the second means for switching the second thermostat in series with the air conditioner after the predetermined period;

wherein the apparatus is adaptable to be retrofit to a room having previously installed occupant-controllable thermostat and air conditioning unit or to be used with separate thermostat and air conditioning units; the housing having a plurality of terminals thereon for attaching wires from the previously installed second thermostat and to the previously installed air conditioning unit, for attaching control wires between the housing and the air conditioning unit, and for attaching a power line to supply power to lights.

2. The apparatus of claim 1 wherein the housing further includes a lower blower speed input and output terminal and a higher blower speed input and output terminals for connecting to a blower speed control wires from the second thermostat and to a blower of the air conditioning unit; and wherein the housing further includes a third relay means for connecting each input terminal to the respective output terminal in response to the switch assuming the first state and, in response to the switch assuming the second state, for disconnecting each input terminal from the respective output terminal and connecting to the lower blower speed output terminal a power signal to operate the blower at the lower speed when the switch is in the second state.

3. The apparatus of claim 1 wherein the delay means is integrally formed with an electronically controlled first thermostat in an electronic circuit within the housing, the electronic thermostat having a variable resistor for setting the set temperature.

* * * * *

UNITED STATES PATENT AND TRADEMARK OFFICE
CERTIFICATE OF CORRECTION

PATENT NO. : 5,305,952
DATED : April 26, 1994
INVENTOR(S) : Suwat Hannarong

It is certified that error appears in the above-indentified patent and that said Letters Patent is hereby corrected as shown below:

Column 1, line 14, delete "/nly" and insert --only--.

Column 3, line 23, delete "$T_{/ccupant}$" and insert --$T_{occupant}$--.

Column 4, line 11, delete "/bject" and insert --object--.

Column 4, line 37, delete "form" and insert --from--.

Signed and Sealed this

Twenty-third Day of August, 1994

Attest:

BRUCE LEHMAN

Attesting Officer        Commissioner of Patents and Trademarks